United States Patent
Oh et al.

(10) Patent No.: US 11,448,167 B2
(45) Date of Patent: Sep. 20, 2022

(54) ACTIVE PURGE SYSTEM FOR HYBRID VEHICLE AND ACTIVE PURGE METHOD FOR HYBRID VEHICLE

(71) Applicants: HYUNDAI MOTOR COMPANY, Seoul (KR); KIA MOTORS CORPORATION, Seoul (KR)

(72) Inventors: Young-Kyu Oh, Gwacheon-si (KR); Keum-Jin Park, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/208,639

(22) Filed: Mar. 22, 2021

(65) Prior Publication Data
US 2022/0186688 A1     Jun. 16, 2022

(30) Foreign Application Priority Data

Dec. 14, 2020  (KR) ........................ 10-2020-0174311

(51) Int. Cl.
*F02M 25/08* (2006.01)
*F02D 41/00* (2006.01)
*B60K 15/035* (2006.01)

(52) U.S. Cl.
CPC ... *F02M 25/0836* (2013.01); *B60K 15/03504* (2013.01); *F02D 41/004* (2013.01); *F02D 41/0045* (2013.01); *F02M 25/089* (2013.01); *B60K 2015/03514* (2013.01)

(58) Field of Classification Search
CPC .. F02M 25/08; F02M 25/0836; F02M 25/089; F02D 41/00; F02D 41/004; F02D 41/0045; B60K 15/03504; B60K 2015/03514

USPC .................................................. 123/497–520
See application file for complete search history.

(56) References Cited

U.S. PATENT DOCUMENTS

| 10,920,691 | B1  | 2/2021 | Oh |
|------------|-----|--------|-----|
| 2009/0205889 | A1 | 8/2009 | Leone |
| 2013/0233287 | A1* | 9/2013 | Leone ................. F02D 41/0045 123/520 |

(Continued)

FOREIGN PATENT DOCUMENTS

| CN | 112696280 A | 4/2021 |
| JP | 2010-275985 A | 12/2010 |

(Continued)

OTHER PUBLICATIONS

Chinese Patent Application No. 202120727987.2, First Office Action dated Oct. 11, 2021.

*Primary Examiner* — John Kwon
*Assistant Examiner* — Johnny H Hoang
(74) *Attorney, Agent, or Firm* — McDonnell Boehnen Hulbert & Berghoff LLP

(57) ABSTRACT

The present disclosure relates to an active purge system and an active purge method for a hybrid vehicle, and changes a control method for the throughput of the evaporation gas according to the engine torque according to a change in an optimal operating line, the system efficiency, or the state of charge (SOC) condition of a battery using an active purge unit for pressing the evaporation gas generated by a fuel tank and supplying the pressed evaporation gas to an intake pipe, thereby efficiently purging the evaporation gas.

12 Claims, 12 Drawing Sheets

(56) References Cited

U.S. PATENT DOCUMENTS

| | | | |
|---|---|---|---|
| 2017/0159588 A1* | 6/2017 | Honjo | F02D 41/263 |
| 2018/0326974 A1* | 11/2018 | Kim | B60W 20/50 |
| 2018/0347511 A1* | 12/2018 | Makino | F02D 41/0032 |
| 2019/0101082 A1* | 4/2019 | Sanuma | F02M 25/0836 |
| 2019/0112993 A1* | 4/2019 | Noh | F02D 41/08 |
| 2019/0203666 A1* | 7/2019 | Asanuma | F02M 25/08 |
| 2019/0331036 A1* | 10/2019 | Asanuma | F02D 41/003 |
| 2019/0345885 A1* | 11/2019 | Asanuma | F02M 25/0836 |
| 2019/0368434 A1* | 12/2019 | Asanuma | F02D 41/0045 |
| 2020/0049107 A1* | 2/2020 | Lee | C08K 5/02 |
| 2020/0063670 A1* | 2/2020 | Asanuma | B60K 15/03 |
| 2020/0191099 A1* | 6/2020 | Koo | F02M 25/0836 |

FOREIGN PATENT DOCUMENTS

| | | |
|---|---|---|
| JP | 2013-056620 A | 3/2013 |
| JP | 5741698 B2 | 7/2015 |
| JP | 5895407 B2 | 3/2016 |
| JP | 6186908 B2 | 8/2017 |
| KR | 10-1262605 B1 | 5/2013 |
| KR | 10-1284345 B1 | 7/2013 |
| KR | 10-1714206 B1 | 3/2017 |
| KR | 2019-0042254 A | 4/2019 |
| KR | 10-2097949 B1 | 4/2020 |
| KR | 2020-0067487 A | 6/2020 |
| KR | 10-2175263 B1 | 11/2020 |
| KR | 2020-0127640 A | 11/2020 |

\* cited by examiner

ACTIVE PURGE SYSTEM FOR HYBRID VEHICLE AND ACTIVE PURGE METHOD FOR HYBRID VEHICLE

CROSS REFERENCE TO RELATED APPLICATIONS

This application claims priority to Korean Patent Application No. 10-2020-0174311, filed on Dec. 14, 2020, which is incorporated herein by reference in its entirety.

BACKGROUND

Field of the Disclosure

The present disclosure relates to an active purge system for a hybrid vehicle and an active purge method for a hybrid vehicle, and more specifically, to an active purge system for a hybrid vehicle and an active purge method for a hybrid vehicle, which control the evaporation gas treatment according to a change in a system efficiency optimal line upon the increase in the part load max of an engine.

Description of Related Art

In recent years, the fuel consumption saving of a vehicle is emerging as a consideration of energy saving, environmental pollution prevention, or the like. As the method for reducing the fuel consumption, there are largely methods such as the reduction in the weight of the vehicle, the saving of the exhaust gas, and the improvement in the fuel efficiency. Particularly, in the case of the improvement in the fuel efficiency of the vehicle, if an engine is operated in the lowest fuel efficiency state, it is possible to improve the efficiency of the fuel efficiency.

In this regard, a conventional hybrid electric vehicle (HEV) controls the torque of the engine to be operated by an optimal operating line (OOL) at the set engine RPM, and a hybrid control unit (HCU) improves the fuel efficiency of the engine by appropriately distributing the torque of a motor in the optimal operating line condition of the engine.

Meanwhile, since the engine mounted on the hybrid vehicle should be located in an engine room together with an HSG, a motor, and the like, it is being downsized. Therefore, in recent years, even if the emission of the engine is reduced, a supercharger is mounted to generate a large output.

Meanwhile, the evaporation gas is generated inside a fuel tank in which the fuel supplied to the engine is stored. The fuel is evaporated and the evaporation gas is generated according to a change in the temperature or pressure inside the fuel tank. If the evaporation gas is to be continuously generated, there is the possibility of increasing the internal pressure in the fuel tank more than necessary. If the evaporation gas is leaked from the fuel tank, it pollutes the atmosphere.

Therefore, a purge system for removing the evaporation gas is mounted on the vehicle. The purge system generally includes a canister for collecting the evaporation gas, and a purge control valve connecting the canister to an intake pipe. If a supercharger is not mounted on the engine, the evaporation gas collected in the canister by the intake pressure applied to the intake pipe is introduced into the intake pipe when the canister and the intake pipe communicate with each other by an operation of the purge control valve.

However, if the supercharger is to be mounted, the internal pressure of the intake pipe may be equal to or higher than the atmospheric pressure by the operation of the supercharger. In this case, there is the possibility in the general purge system that the evaporation gas does not move from the canister to the intake pipe but the intake air is to be moved from the intake pipe to the canister.

To solve such a problem, instead of the conventional purge using the intake negative pressure, an active purge system (APS) for forcibly performing the purge of the evaporation gas by operating a separate purge pump is being developed by the applicant.

The contents described in Description of Related Art are to help the understanding of the background of the present disclosure, and may include what is not previously known to those skilled in the art to which the present disclosure pertains.

SUMMARY

FIGS. 1A and 1B illustrate a BSFC map for controlling a conventional engine, and specifically, FIG. 1A illustrates a BSFC map for controlling an engine of a conventional hybrid vehicle adopting a natural intake engine, and FIG. 1B illustrates a BSFC map for controlling an engine of a hybrid vehicle adopting a T-GDi engine. In FIGS. 1A and 1B, the horizontal axis indicates the rpm of an engine 600, the vertical axis indicates the torque (N*m) of the engine 600, and the contour line indicates the BSFC [g/(kW*h)].

In the case of the conventional hybrid vehicle adopting the natural intake engine illustrated in FIG. 1A, a part load max line is controlled at the operating line based on a theoretical air-fuel ratio of 1.0. In this regard, the hybrid vehicle adopting the T-GDi engine to which the turbo charger illustrated in FIG. 1B is applied may be controlled based on the theoretical air-fuel ratio of 0.8 to 0.9, thereby improving the part load max line compared to the natural intake engine.

As a result, it is possible to improve the efficiency of the hybrid system by about 5 to 15% compared to the natural intake. Further, when an EV traveling mode is expanded according to the improvement in the efficiency of the system, the emission of $CO_2$ discharged when the engine is driven is reduced, whereas the fuel efficiency may be improved.

Meanwhile, in the aforementioned active purge system, since the evaporation gas is purged while the engine is driven, as described above, the operation region capable of purging the evaporation gas is reduced when the EV traveling mode is expanded. Therefore, it is necessary to treat the evaporation gas by a control method different from that of the conventional hybrid system adopting the natural intake engine.

The present disclosure is devised to solve the above problem, and an object of the present disclosure is to provide an active purge system and an active purge method for a hybrid vehicle, which may effectively purge the evaporation gas even if the operation line having the optimized system efficiency is changed according to the increase in the part load max line in the hybrid vehicle adopting the T-GDi engine.

An active purge system for a hybrid vehicle according to the present disclosure for achieving the object includes an active purge unit for pressing the evaporation gas generated by a fuel tank and supplying the pressed evaporation gas to an intake pipe, and a control unit for controlling the active purge unit, in which the control unit controls the throughput of the evaporation gas according to the engine torque according to a change in an optimal operating line, the system efficiency, or the state of charge (SOC) condition of a battery.

Preferably, the active purge unit may include a purge line connecting the intake pipe to a canister for adsorbing the evaporation gas, a purge pump mounted on the purge line, and a purge valve mounted on the purge line to be located between the purge pump and the intake pipe.

Preferably, the control unit may adjust the RPM of the purge pump and the opening amount of the purge valve for each of a plurality of steps such that the evaporation gas flowing from the purge line to the intake pipe becomes a target purge flow rate.

Preferably, the control unit may control to reduce the number of steps about the RPM of the purge pump and/or the opening amount of the purge valve, when the engine torque is controlled to be increased compared to a driver demand reference torque according to the change in the optimal operating line.

Preferably, the control unit may perform an ON/OFF control for the RPM of the purge pump and/or the opening amount of the purge valve, when the engine torque is controlled to be increased compared to a driver demand reference torque according to the change in the optimal operating line.

Further, an active purge method for a hybrid vehicle having the aforementioned active purge system for achieving the object includes updating an optimal operating line of the hybrid vehicle, controlling the engine torque to be increased compared to a reference torque so as to satisfy the updated optimal operating line, and controlling the throughput of the evaporation gas according to the increasing control of the engine torque according to a change in the optimal operating line.

Preferably, the updating the optimal operating line of the hybrid vehicle may include determining whether a vehicle speed is constant, swing-controlling an engine torque value around a reference torque, if it is determined that the vehicle speed is constant, dividing the engine torque into a plurality of sections upon the swing control and measuring system efficiency in each section, and updating an operating line corresponding to the torque having the maximum system efficiency among the plurality of sections as an optimal operating line.

Preferably, the controlling of the engine torque to be increased compared to the reference torque may include calculating a difference value between an actually measured torque value of the reference torque and a model value as an error correction torque value, calculating a difference value between the model value and the torque having the maximum system efficiency as an optimal operating line potential value, and controlling the engine torque to be increased compared to the reference torque based on a value obtained by summing the error correction torque value and the operating line potential value.

Preferably, the updating of the optimal operating line of the hybrid vehicle may further include measuring the state of charge (SOC) of a battery, calculating an engine torque compensation value for driving the vehicle and charging the battery according to a pre-defined map, if the SOC is a reference value or less when comparing the SOC of the battery with the reference value; and compensating the reference torque by summing the calculated engine torque compensation value and the reference torque.

Preferably, the updating of the optimal operating line of the hybrid vehicle may further include calculating the engine torque compensation value according to a voltage use prediction amount calculated based on the atmospheric pressure and outside air temperature of a traveling area, calculating a final engine torque compensation value by summing the calculated engine torque compensation value and the engine torque compensation value for charging the battery, and compensating the reference torque by summing the final engine torque compensation value and the reference torque.

Preferably, the controlling of the throughput of the evaporation gas may control to reduce the number of steps about the RPM of the purge pump and the opening amount of the purge valve.

Preferably, the controlling of the throughput of the evaporation gas may perform an ON/OFF control for the RPM of the purge pump and the opening amount of the purge valve.

The active purge system for the hybrid vehicle and the active purge method for the hybrid vehicle according to the exemplary embodiment of the present disclosure configured as described above may move the evaporation gas from the canister to the intake pipe even while the supercharger is operated.

Particularly, the hybrid vehicle adopting the T-GDi engine may effectively purge the evaporation gas even when the operating line having the optimized system efficiency is changed according to the increase in the part load max line and the EV traveling mode is expanded.

DETAILED DESCRIPTION

Hereinafter, an active purge system for a hybrid vehicle and an active purge method for a hybrid vehicle according to an exemplary embodiment of the present disclosure will be described with reference to the accompanying drawings.

A vehicle mounted with an active purge system for a hybrid vehicle according to an exemplary embodiment of the present disclosure is provided with an engine 600 connected to an intake pipe I, a motor 700 for generating a driving force together with the engine 600 or generating the driving force alone, and a battery 800 for supplying power to the motor 700.

Figure 4:
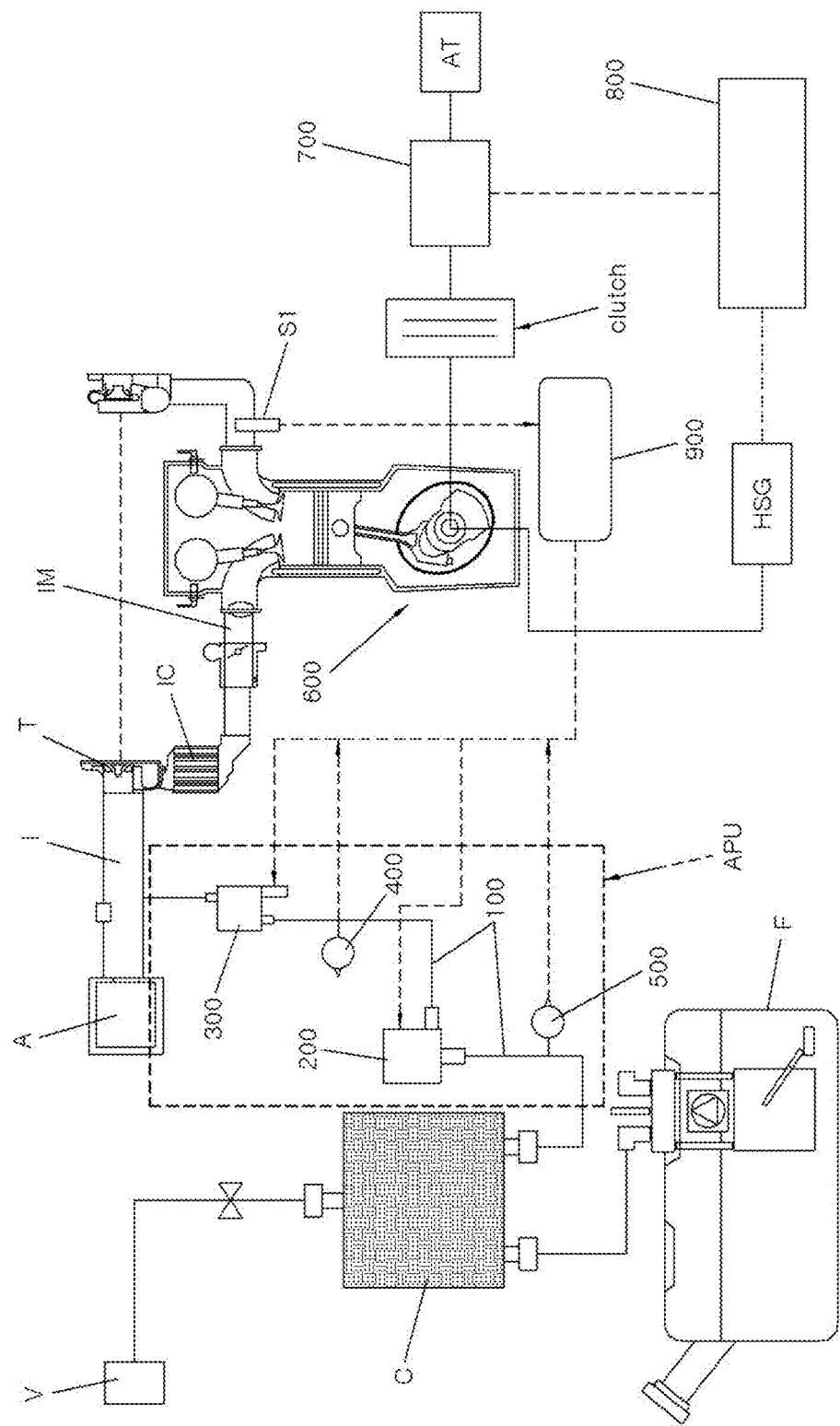
FIG. 4 is an exemplary diagram of an active purge system for a hybrid vehicle according to an exemplary embodiment of the present disclosure.

As illustrated in FIG. 4, the active purge system for the hybrid vehicle according to the exemplary embodiment of the present disclosure includes an active purge unit (APU) for pressing the evaporation gas generated by a fuel tank F and supplying the pressed evaporation gas to the intake pipe I, and a control unit 900 for controlling the active purge unit (APU).

The active purge unit (APU) includes a purge line 100 connecting a canister C adsorbing the evaporation gas generated by the fuel tank F to the intake pipe I, a purge pump 200 mounted on the purge line 100, a purge valve 300 mounted on the purge line 100 to be located between the purge pump 200 and the intake pipe I, a first pressure sensor 400 mounted on the purge line 100 to be located between the purge pump 200 and the purge valve 300, and a second pressure sensor 500 mounted on the purge line 100 to be located between the canister C and the purge pump 200.

The control unit 900 receives signals from the battery 800, the first pressure sensor 400 and the second pressure sensor 500, and transmits operating signals to the purge pump 200 and the purge valve 300.

Figure 1A:
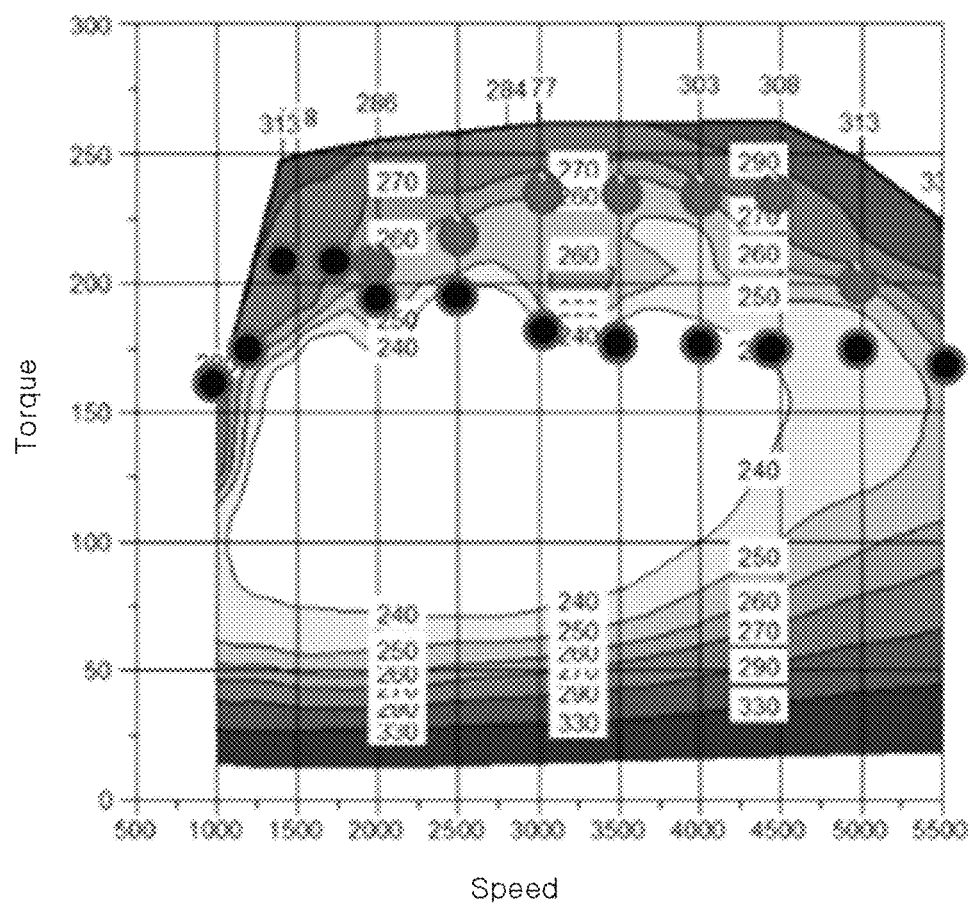
FIGS. 1A and 1B show a BSFC map.
Figure 1B:
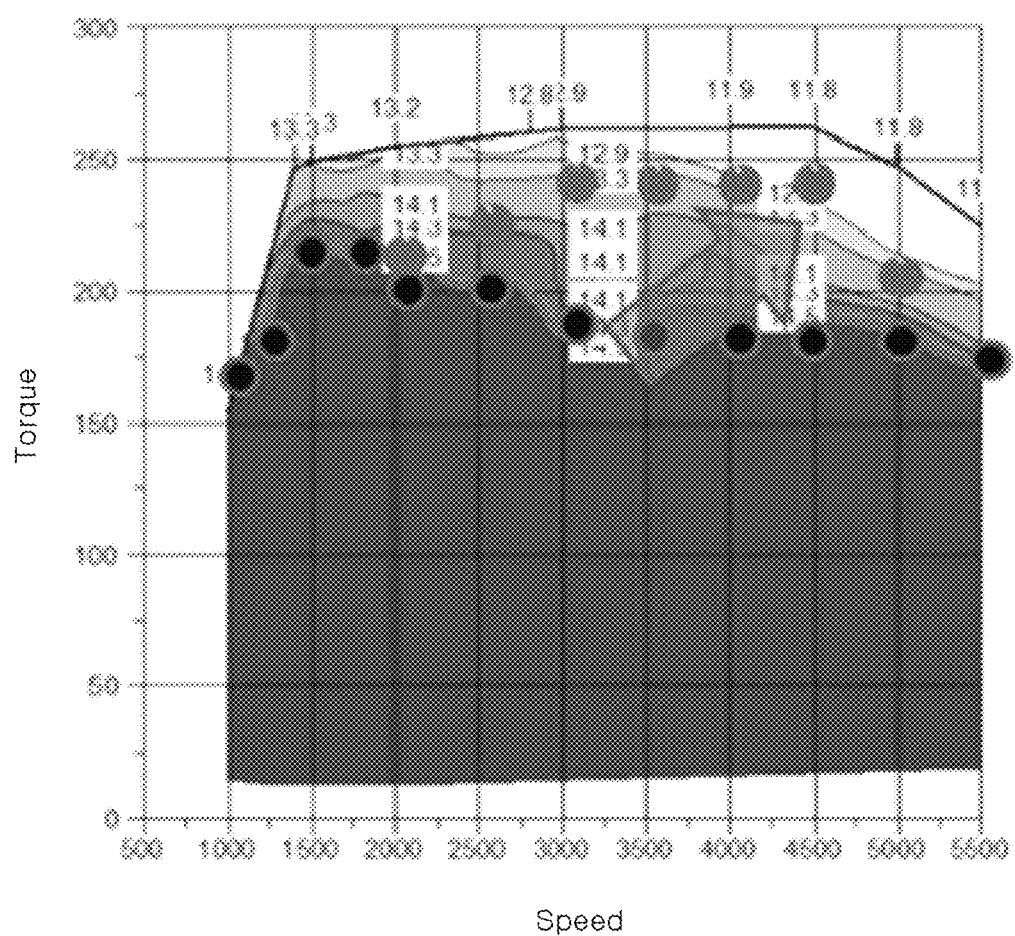

Further, the control unit 900 controls the operation of the engine 600 according to the BSFC map illustrated in FIGS. 1A and 1B. For example, if a shift stage is a fifth stage, the control unit 900 controls the operation of the engine 600 to be closest to a fifth gear line drawn on the BSFC map. The control unit 900 may also control a transmission to be shifted from the fifth stage to the fourth stage in order to increase the rpm and increase the torque.

Further, the control unit 900 controls the engine torque to be operated on the optimal operating line (OOL) at a preset engine RPM, when controlling the engine according to the BSFC map. At this time, if the system efficiency is changed according to the increase in a part load max line in the hybrid vehicle provided with a turbocharger, the control unit 900 according to the present disclosure changes the optimal operating line based on the changed system efficiency, and thus changes the RPM of the purge pump 200 by a control method for each step.

Here, the system efficiency is defined as a rate of the driving energy of the hybrid vehicle to an amount of fuel used. The driving energy of the hybrid vehicle means the energy driving energy and the motor charging energy when the hybrid vehicle travels as the HEV and the motor discharging energy when the hybrid vehicle travels as the EV. Specifically, the system efficiency may be represented as the efficiency of each component in the energy path through which the used fuel energy is converted into the driving energy, and that factor is composed of the engine efficiency, the charging and discharging path efficiency, and the transmission efficiency.

Here, the charging and discharging path efficiency means the energy efficiency for the electricity flow. While the hybrid vehicle travels as the HEV, the engine power is distributed to the charging of the motor and the input of the transmission, and at this time, the energy supplied for charging the motor charges a high-voltage battery, and the charged energy is input and supplied back to the transmission and used while the hybrid vehicle travels as the EV, and used, and the efficiency going through such a path is referred to as the charging/discharging path efficiency, and as expressed below, defined as the function of Equation 1 below, and obtained by a pre-defined map for each factor.

$$\eta_{trans} = f(E_{eng\_chg}, \eta_{mot\_gen}, \eta_{mot\_drv}, \eta_{bat})$$ Equation 1:

where $E_{eng\_chg}$ refers to the conversion efficiency of the engine power, $\eta_{mot\_gen}$ refers to the motor charging efficiency, $\eta_{mot\_drv}$ refers to the motor driving efficiency, and $\eta_{bat}$ refers to the battery charging efficiency.

Meanwhile, the system efficiency may be calculated by Equation 2 or Equation 3 below.

First, in Equation 2, a system efficiency ($\eta_{sys}$) is calculated by summing the driving energy ($E_{DYNO\_HEV}$) when traveling as the HEV and the driving energy ($E_{DYNO\_EV}$) when traveling as the EV to calculate the final driving energy ($E_{DYNO}$), and then dividing the final driving energy ($E_{DYNO}$) by the fuel energy ($E_{Fuel}$).

$$\eta_{sys} = \frac{E_{DYNO}}{E_{Fuel}} = \frac{E_{DYNO\_HEV} + E_{DYNO\_EV}}{E_{Fuel}}$$ Equation 2

Next, in Equation 3, the system efficiency ($\eta_{sys}$) is calculated by integrating the efficiency of each component configuring the hybrid vehicle.

$$\eta_{sys} = \frac{E_{DYNO}}{E_{Fuel}} = \eta_{eng} \times \eta_{trans} \times \eta_{TM}$$ Equation 3 where the $\eta_{eng}$ refers to the engine efficiency, the $\eta_{trans}$ refers to the aforementioned charging and discharging path efficiency, and the $\eta_{TM}$ refers to the transmission efficiency.

More preferably, the control unit 900 calculates the system efficiency by cross-checking the system efficiency calculated by Equations 2 and 3, and then integrating and correcting a high-voltage battery current.

Figure 2:
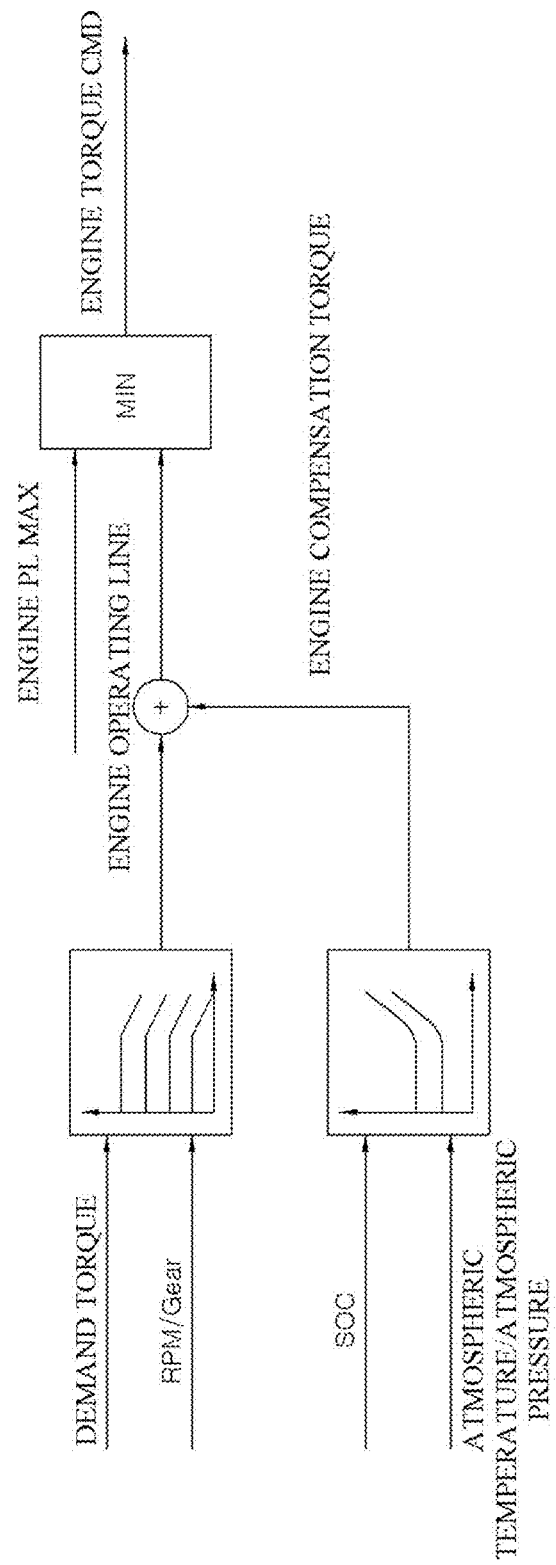
FIG. 2 is a diagram illustrating an engine torque control algorithm according to an engine optimal operating line.

Meanwhile, FIG. 2 illustrates an engine torque control algorithm according to an engine optimal operating line performed by the control unit 900.

When the demand torque, the engine RPM, and the shift gear are input by the driver's operation, the control unit 900 determines the operating line according to a pre-defined BSFC map.

When the state of charge (SOC) charged in the battery of the hybrid vehicle is low, or a lot of voltage of the battery is required, it is necessary to drive the engine more than the engine torque based on the operating line to increase the state of charge of the battery.

Therefore, the control unit 900 determines an engine compensation torque according to the measurement result of the SOC, the atmospheric temperature, and the atmospheric pressure obtained by the information obtained by a sensor provided in the vehicle, a network, or the like and a pre-defined map using the measurement result as a factor.

As described above, if the SOC is a reference value or less when comparing the SOC with a pre-defined reference value, the compensation torque for supplementing the SOC of the battery may be determined.

Further, when the altitude increases and the atmospheric pressure decreases, the torque of the engine is reduced, such that a lot of power support of the motor is required and the high voltage of the battery is required. Therefore, if the atmospheric pressure is less than a pre-defined reference value when comparing the atmospheric pressure with the pre-defined reference value, the compensation torque may be determined such that the voltage required according to the pre-defined map may be satisfied.

Further, if the outside air temperature is high, the torque of the engine is reduced, the performance of the battery is lowered, and a lot of the power source consumption occurs by the operation of the air-conditioner and the like, such that the high voltage of the battery is required. Therefore, if the outside air temperature exceeds a pre-defined reference value when comparing the outside air temperature with the pre-defined reference value, the compensation torque may be determined such that the required voltage according to the pre-defined map may be satisfied.

As described above, the control unit 900 calculates the engine compensation torque based on the information about the SOC, the atmospheric pressure, and the outside air temperature, and then compensates the torque determined according to the engine operating line.

Meanwhile, as described above, the hybrid vehicle adopting the T-GDi engine to which the turbo charger illustrated in FIG. 1B is applied is controlled based on the theoretical air-fuel ratio of 0.8 to 0.9 to increase the part load (PL) max line compared to the natural intake engine. As a result, it is possible to easily change the shift stage to the high-speed stage, and it is possible to entirely increase the vehicle efficiency, thereby increasing the system efficiency.

Figure 3:
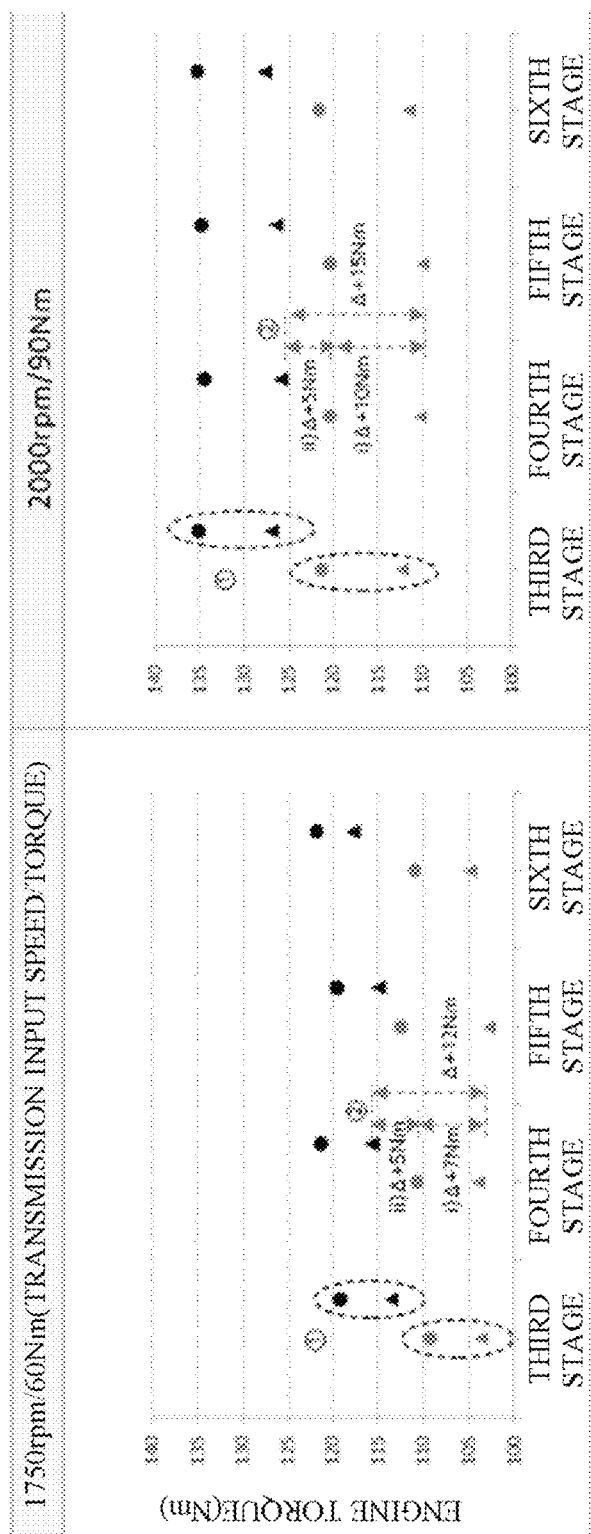
FIG. 3 is a diagram illustrating the location of a system efficiency optimal line for a reference operating line according to the input speed and torque of a transmission.

FIG. 3 is a diagram illustrating the location of the system efficiency optimal line for a reference operating line according to the input speed and torque of the transmission.

As illustrated in FIG. 3, there are two factors affecting the operating line having the optimal system efficiency compared to the current engine operating line.

First, as illustrated in FIG. 3, the influence caused by the difference in the accuracy of the constant-speed engine torque control exists. That is, due to the limitation of the engine torque control accuracy, a difference between an instruction torque (a model torque, indicated by •) and the actually measured torque (indicated by ▲) occurs (corresponding to the i of (2) in FIG. 3).

Further, there exists the influence on a margin (an optimal operating line potential, corresponding to the ii of (2) in FIG. 3) compared to the reference torque (the model torque) at which the system efficiency is optimized by the engine torque swing evaluation to be described later.

For example, in the examples illustrated in FIG. 3, if the input speed of the transmission is 1750 RPM and the torque thereof is 60 Nm, when the accuracy of the engine torque control and the engine optimal operating line potential are broken down and calculated, the system efficiency is optimized in the case of increasing the engine torque by 12 Nm compared to the reference engine operating line. Further, if the input RPM of the transmission is 2000 RPM and the torque thereof is 90 Nm, the system efficiency is optimized in the case of increasing the engine torque by 15 Nm compared to the reference operating line.

Therefore, the control unit 900 may calculate the operating line having the optimized system efficiency from the engine operating line determined in consideration of the driver demand torque, the SOC, the outside air temperature, the atmospheric pressure, and the like, and then increase the mapping of the engine operating line according to the result, thereby maximizing the system efficiency. In this case, the engine torque for achieving the optimal operating line, the optimal system efficiency, and the SOC condition of the battery are changed, thereby expanding the EV traveling mode.

However, in this case, when the EV traveling mode is expanded, the operating region in which the evaporation gas may be purged is reduced, such that considering such a point, as described later, the control unit 900 changes the RPM of the purge pump 200 by the control method for each step.

Meanwhile, the active purge system for the hybrid vehicle according to the exemplary embodiment of the present disclosure treats the evaporation gas. The canister C is connected with the atmosphere through a line. The line is provided with a vent valve V. The vent valve V selectively discharges only the air to the outside of the canister C or introduces only the air from the outside into the canister C. The control unit 900 receives a signal from a lambda sensor S1 for sensing an amount of oxygen of the combustion gas. The control unit 900 derives the air-fuel ratio of the mixed gas combusted by a combustion chamber based on an amount of oxygen sensed by the lambda sensor S1. The control unit 900 transmits and receives the signal to and from a fuel supply system for supplying the fuel to the combustion chamber.

The intake pipe I is located between an air cleaner A and a turbocharger T. An intercooler IC is provided between the turbocharger T and an intake manifold IM.

The purge line 100 is provided with the purge pump 200, the purge valve 300, the first pressure sensor 400, the second pressure sensor 500, and a flow meter sensor (not illustrated). The first pressure sensor 400 and the second pressure sensor 500 sense the pressures of the front end and the rear end of the purge pump 200 to continuously transmit the pressures to the control unit 900. The flow meter sensor is located between the purge valve 300 and the intake pipe I. The flow meter sensor continuously senses an amount of evaporation gas flowing from the purge line 100 to the intake pipe I and transmits an amount of evaporation gas to the control unit 900.

The control unit 900 adjusts the RPM of the purge pump 200 and the opening amount of the purge valve 300 such that the evaporation gas flowing from the purge line 100 to the intake pipe I becomes a target purge flow rate by synthesizing the signals received from the fuel supply system, the lambda sensor S1, the first pressure sensor 400, the second pressure sensor 500, and the flow meter sensor. The fuel supply system transmits the vehicle speed, a current amount of fuel injected, and the like to the control unit 900.

The target purge flow rate is a pre-induced value such that the mixed ratio of the fuel supplied to the combustion chamber and the intake air may finally become the theoretical air-fuel ratio in consideration of the engine conditions (rpm, coolant temperature, and the like), the vehicle speed, and the operating state of the fuel supply system.

According to an example, the control unit 900 operates the purge pump 200 with one or more pre-defined operating RPMs such that the flow rate of the evaporation gas becomes the target purge flow rate, and operates the purge valve 300 to be one or more pre-defined opening amounts according to the operating RPM of the purge pump 200. The operating RPM of the purge pump 200 may be controlled for each step with four steps of 15000, 30000, 45000, and 60000, and the opening amount of the purge valve 300 may be controlled for each step to 100%, 70%, 50%, and 30%.

Since the control unit 900 controls the operation of the purge pump 200 and the purge valve 300 based on the information sensed by various sensors to adjust an amount of evaporation gas flowing from the purge line 100 to the intake pipe I, the concentration or density of the evaporation gas supplied from the canister C to the intake pipe I may be adjusted.

As illustrated in FIGS. 5 to 10, the active purge system for the hybrid vehicle according to the exemplary embodiment of the present disclosure treats the evaporation gas.

Figure 5:
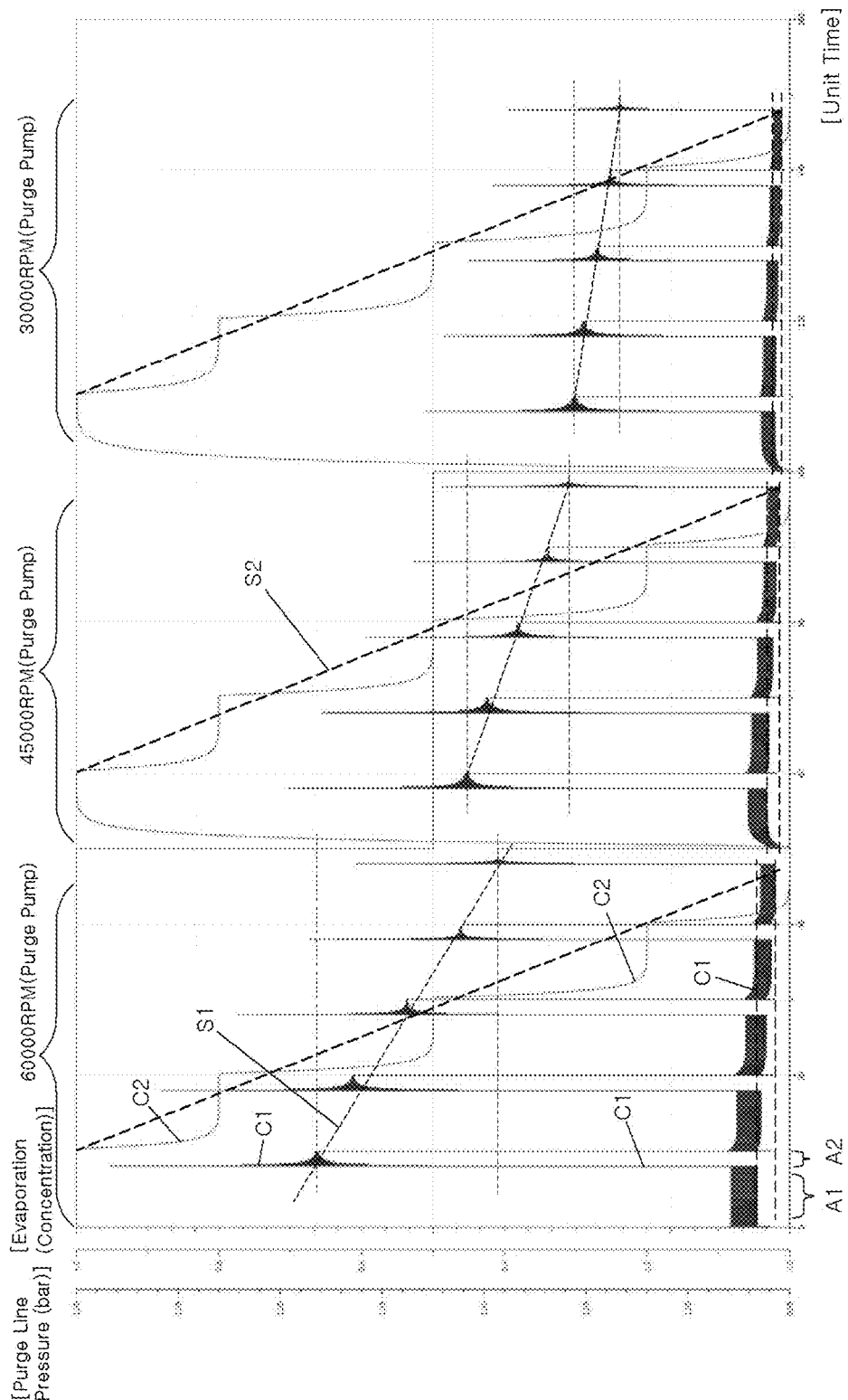
FIG. 5 is a graph illustrating the state of a purge line when a purge pump and a purge valve are operated.

FIG. 5 illustrates, as a graph, the pressure C1 and the evaporation gas concentration C2 between the purge pump 200 and the purge valve 300 in the purge line 100, in the case of maintaining the RPM of the purge pump 200 at 60000, 45000, and 30000 for a unit time and then sequentially changing them, and repeating the closing and opening amount of the purge valve 300 at regular intervals many times.

While the purge pump 200 maintains 60000, 45000, and 30000 RPMs, the pressure C1 is maintained in the relatively low state (section A1) when the purge valve 300 is opened, and then maintained in the relatively high state (section A2) when the purge valve 300 is closed. The evaporation gas concentration C2 is largely decreased when the purge valve 300 maintains the opened state, and maintains the state when the purge valve 300 is closed.

As the interval time between the opening and closing of the purge valve 300 is decreased, it is estimated that all of the pressure C1 and the evaporation gas concentration C2 will be linearly decreased.

As the rotation of the purge pump 200 is maintained by a small number of RPMs, the degree of the change in the pressure C1 according to the repetitive opening and closing of the purge valve 300 is small (see S1). Even if the RPM of the purge pump 200 is maintained at different RPMs, the degree of the change in the evaporation gas concentration C2 due to the opening and closing of the purge valve 300 is constant (see S2).

As a result, as the purge valve 300 is opened and closed while the purge pump 200 maintains the same RPM, the trend of the change in the pressure C1 and the evaporation gas concentration C2 may be linearly calculated.

Therefore, according to the adjustment of the RPM of the purge pump 200 and the opening and closing operation of the purge valve 300, the evaporation gas of the proper concentration may be supplied to the intake pipe I at the proper pressure. Since the pressure of the evaporation gas supplied from the purge line 100 to the intake pipe I may be controlled to be higher than the internal pressure of the intake pipe I, the evaporation gas may be injected into the intake pipe I even if a supercharger is operated.

Figure 6:
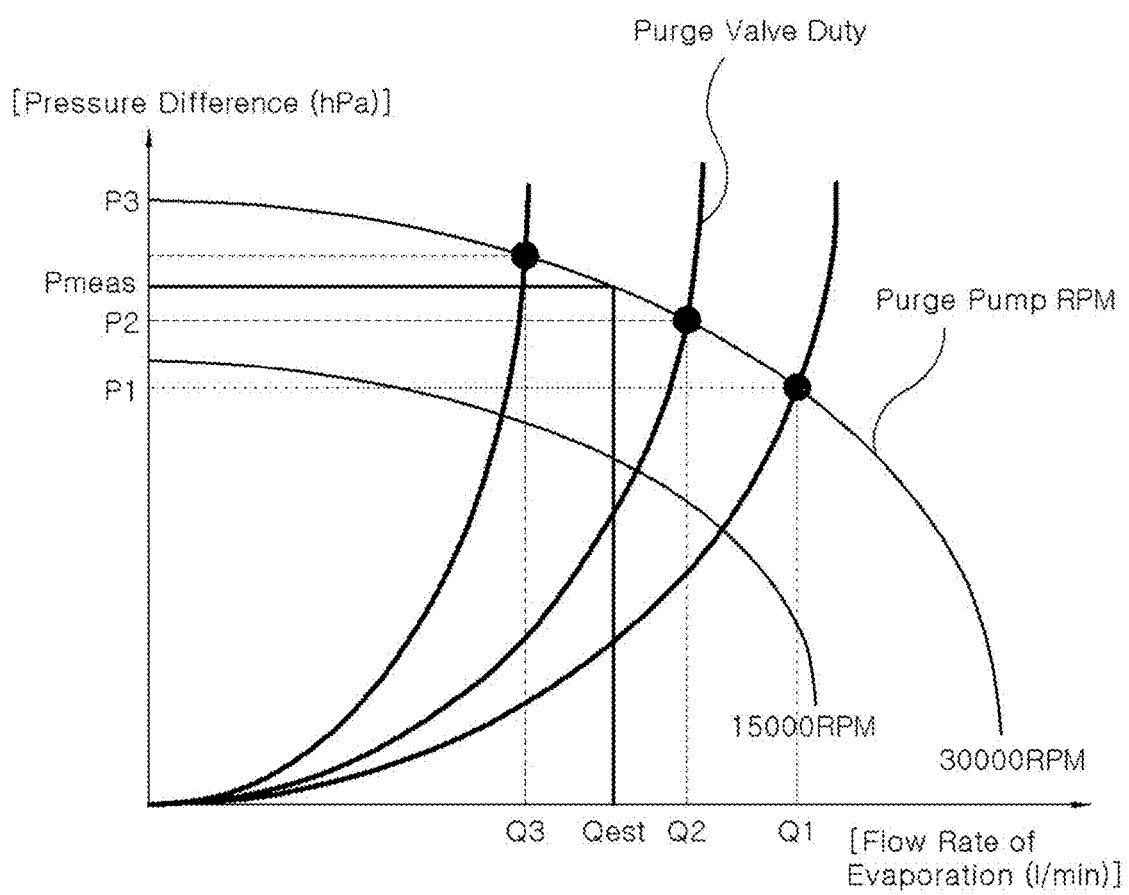
FIG. 6 is an exemplary diagram of a graph for deriving the flow rate of the evaporation gas according to the operation of the purge pump.

FIG. 6 illustrates the characteristic grape of the purge pump 200. The X axis indicates the flow rate, and the Y axis indicates the pressure difference between the front end and rear end of the purge pump 200. As illustrated in FIG. 6, if the RPM of the purge pump 200, the pressure difference between the front end and rear end of the purge pump 200, and the opening amount of the purge valve 300 are known, the flow rate of the evaporation gas introduced from the purge line 100 to the intake pipe I may be derived from a pre-prepared graph.

Figure 7:
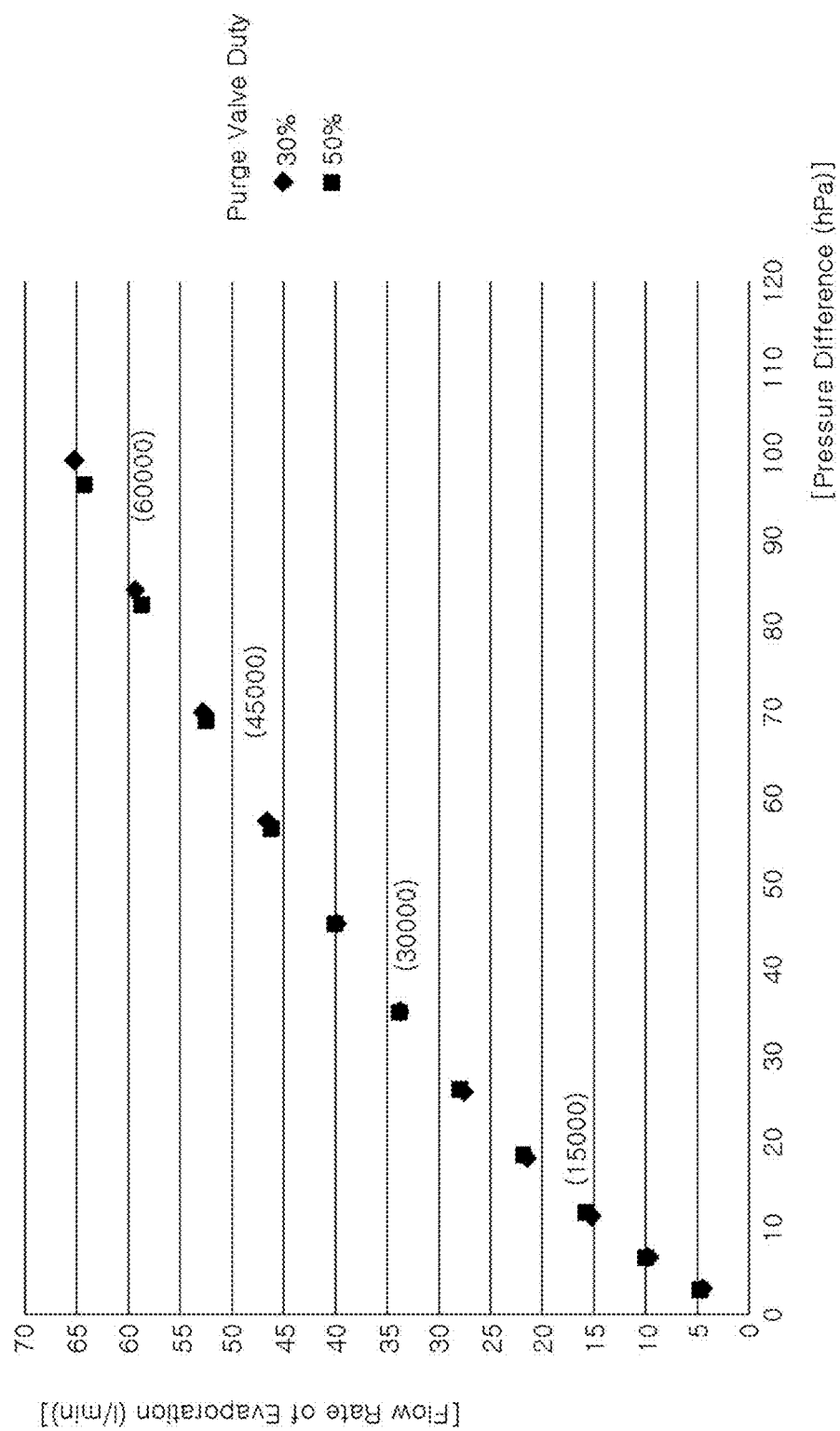
FIGS. 7, 8, and 9 are graphs illustrating the flow rate of the evaporation gas according to the operation of the purge pump.
Figure 8:
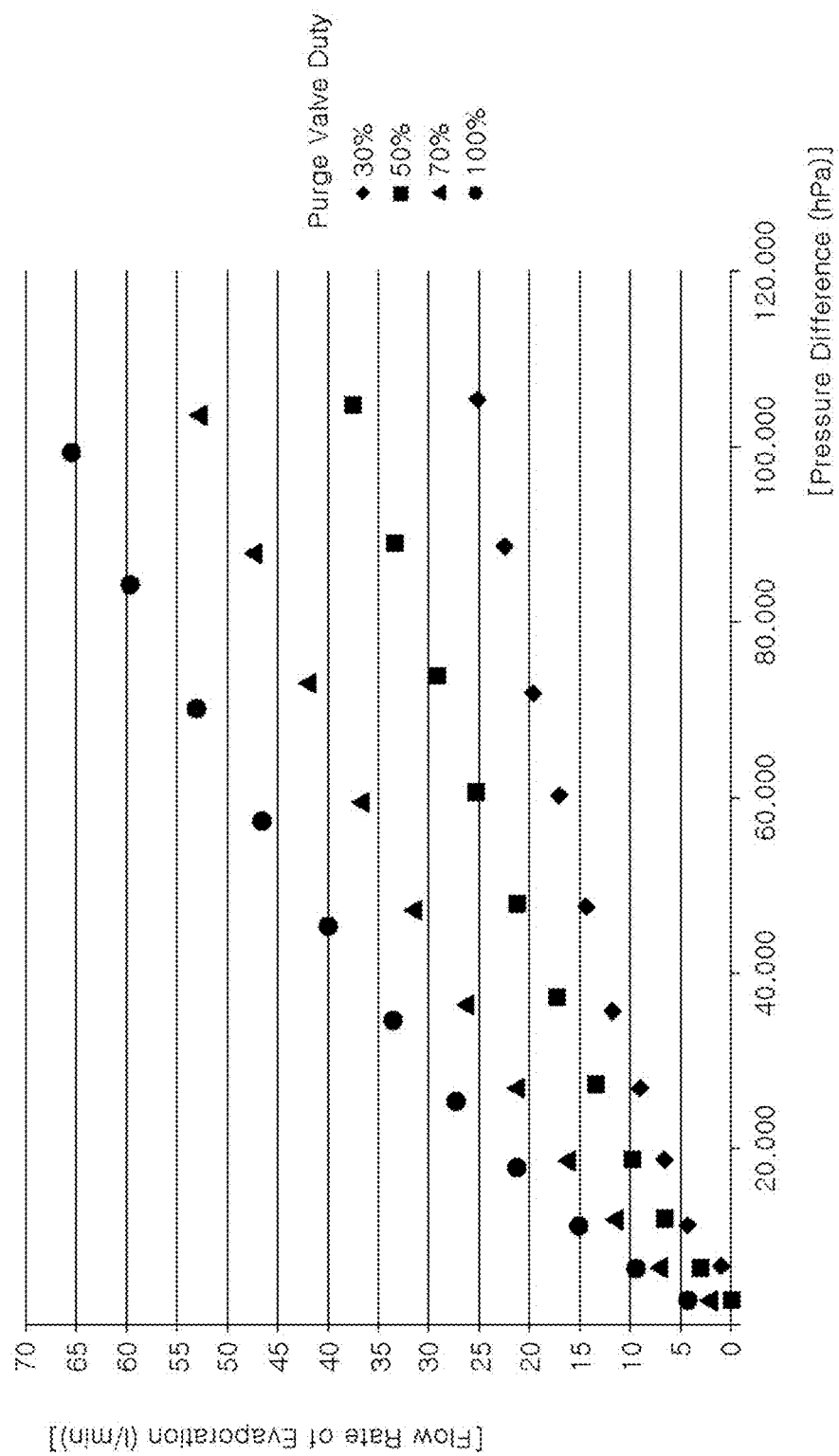
Figure 9:
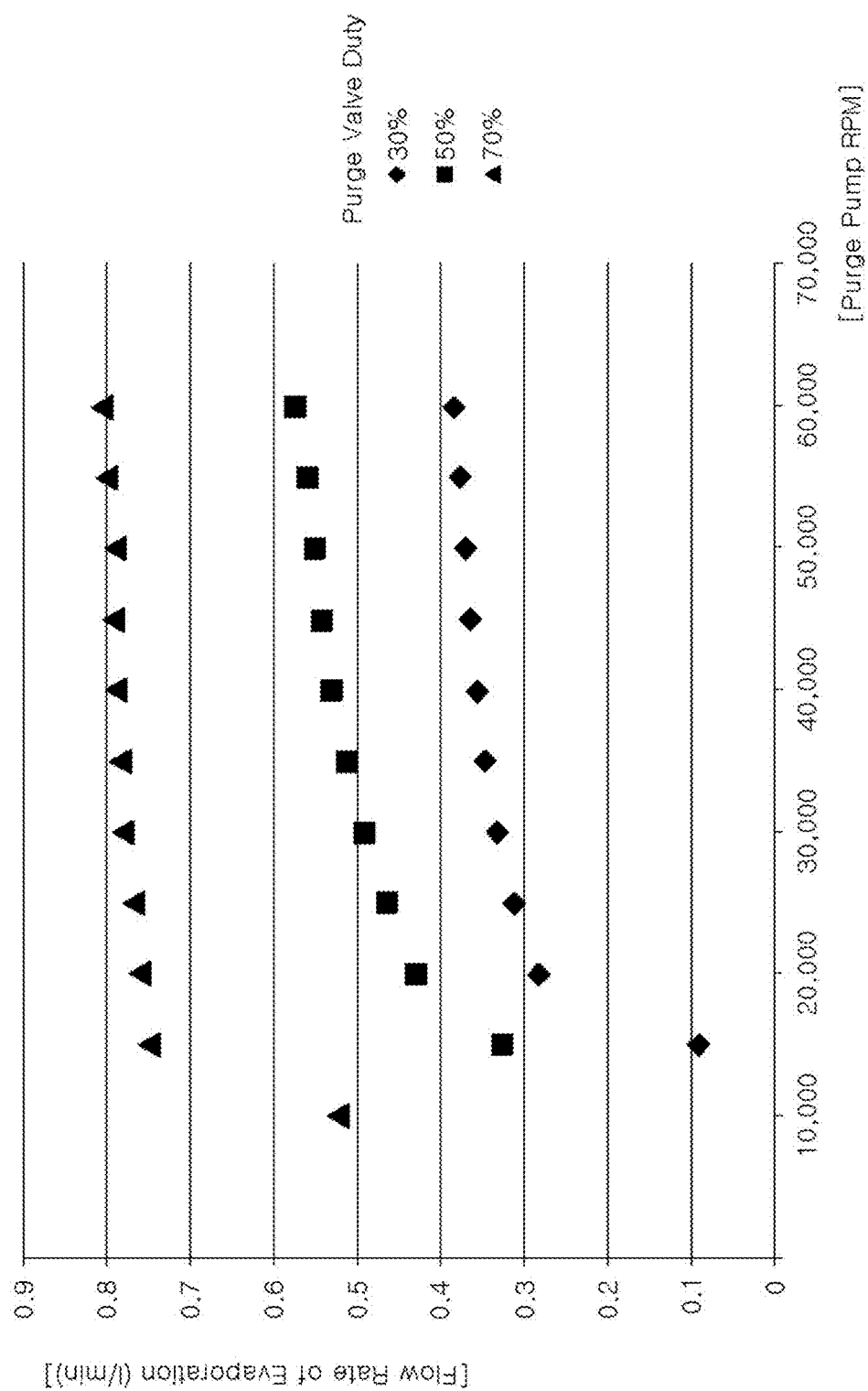

FIGS. 7 to 9 illustrate graphs representing the flow rate of the evaporation gas according to the operation of the purge pump 200. The X axis in FIG. 7 indicates the pressure difference between the front end and rear end of the purge pump 200, and the Y axis indicates the flow rate of the evaporation gas. As the RPM of the purge pump 200 is increased from 15000 to 60000 and the pressure difference between the front end and rear end of the purge pump 200 is increased, the flow rate of the evaporation gas is increased. Such an increase may be linear.

The X axis in FIG. 8 indicates the pressure difference between the front end and rear end of the purge pump 200, and the Y axis indicates the flow rate of the evaporation gas. The RPM of the purge pump 200 is constantly maintained, and the opening amount of the purge valve 300 is changed from 30% to 100% step by step. As the opening amount of the purge valve 300 is increased from 30% to 100% step by step, the flow rate of the evaporation gas is increased compared to the pressure difference between the front end and rear end of the purge pump 200. Such an increase may be linear.

The X axis in FIG. 9 indicates the RPM of the purge pump 200, and the Y axis indicates the flow rate. When the RPM of the purge pump 200 is a proper value or more compared to the case where the opening amount of the purge valve 300 is 100%, the constant flow rate is maintained for each opening amount of the purge valve 300. Therefore, it may be seen that the flow rate of the evaporation gas may be adjusted by adjusting the RPM of the purge pump 200 and adjusting the opening amount of the purge valve 300.

Figure 10:
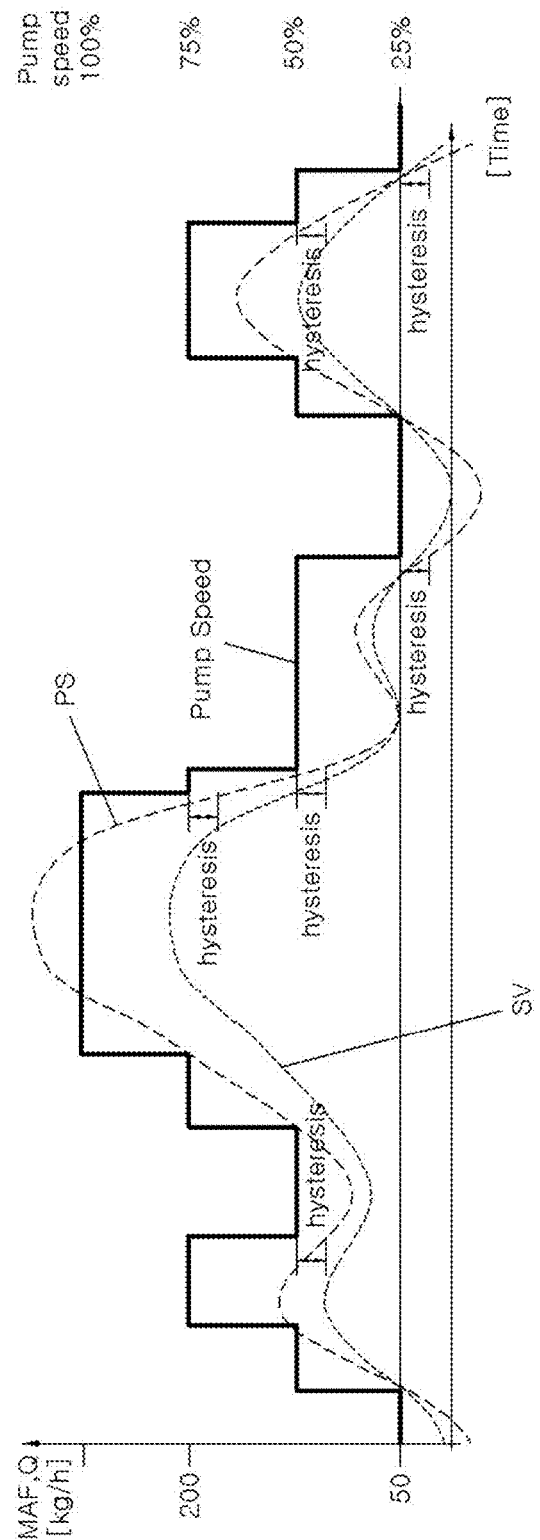
FIG. 10 is a graph illustrating the RPM of the purge pump, the flow rate of the evaporation gas, and the opening amount of the purge valve.

Referring to FIG. 10, while the vehicle travels, the flow rates Q of the evaporation gases when the RPM of the purge pump 200 is appropriately controlled for each step (PS), and when an amount of the evaporation gas flowing through the purge line 100 is adjusted (SV) by the purge valve 30, the flow rate Q of the evaporation gas is non-linearly changed. In each case, the flow rates Q of the evaporation gases do not coincide with each other. This may be a kind of hysteresis.

As described above, the flow rate and concentration of the evaporation gas supplied from the canister C to the intake pipe I may be adjusted, and the density thereof may also be estimated by adjusting the RPM of the purge pump 200, and the opening and closing timing and the opening amount of the purge valve 300.

Meanwhile, as described above, since the purge of the evaporation gas in the active purge system is performed while the engine is driven, the operating region capable of purging the evaporation gas is reduced when the EV traveling mode is expanded by the aforementioned optimization of the system efficiency.

Therefore, as described above, the control unit 900 changes the control method for each step about the RPM of the purge pump 200 or the opening amount of the purge valve 300, if the system efficiency optimal operating line is increased according to the increase in the part load max line, thereby maximizing the efficiency.

For example, in the aforementioned example, the control unit 900 normally controls the operating RPM of the purge pump 200 for each step with four steps of 15000, 30000, 45000, and 60000. In this case, if the system efficiency optimal operating line is increased, thereby maximizing the efficiency, the control unit 900 may omit some of the steps of the operating RPM of the purge pump 200 at the fourth stage, or expand the section for each step together with the omission of the step (e.g., three steps of 15000, 40000, 60000 RPMs). In this case, when the engine is driven and enters into the operable section of the purge pump 200, a larger amount of evaporation gas may be quickly treated. Like the purge pump 200, even in the case of the opening amount of the purge valve 300, some of the steps of the opening may be omitted, or the section for each step may be expanded together with the omission, thereby obtaining the same effect, and the effect may also be further maximized by combining the step-by-step controls of the purge pump 200 and the purge valve 300.

Furthermore, the control unit 900 may further simplify the normal step-by-step control of the operating RPM of the purge pump 200 or the opening amount of the purge valve 300 to the ON/OFF control. In this case, it is possible to further maximize the effect of increasing the throughput of the evaporation gas within the restricted driving section of the purge pump 200 described above.

Figure 11:
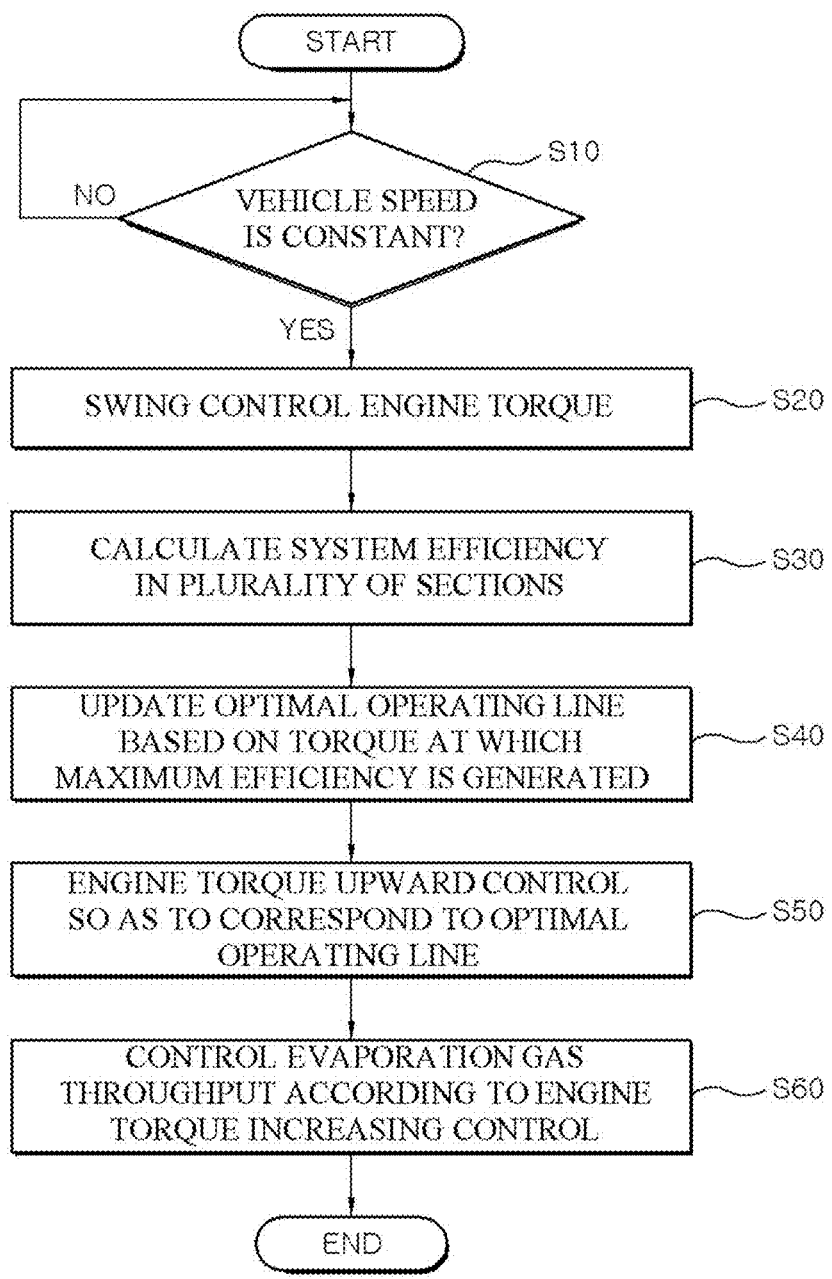
FIG. 11 is a flowchart illustrating an active purge method for a hybrid vehicle according to the exemplary embodiment of the present disclosure.

Hereinafter, an active purge method performed by the control unit 900 of the hybrid vehicle according to the exemplary embodiment of the present disclosure will be described in detail with reference to FIG. 11.

First, the control unit 900 determines whether the vehicle speed is constant within a pre-determined traveling condition at S10. The control unit 900 first determines whether the vehicle travels in the stable state in order to determine the optimal operating line according to the swing control to be described later. Here, as the traveling condition, preferably, the control unit 900 may determine whether the vehicle travels on the flat section rather than the uphill road. Further, in the step S10, the control unit 900 may determine whether the vehicle speed is constant through whether the vehicle speed sensed by a sensor or the like is maintained within a pre-defined range or whether the vehicle travels in the constant-speed traveling mode (the cruise control mode).

In step S20, if it is determined that the vehicle speed is constant, the control unit 900 performs the swing control allowing a plurality of sections to be set by increasing or decreasing the engine torque value around the reference operating line included in the conventional optimal operating line map at S20.

Here, preferably, as described above, the reference operating line is an engine torque value at which the demand torque of the driver, the input engine RPM of the transmission, and the engine operating line determined by the number of gear stages and the operating map are compensated using the information about the SOC, the atmospheric temperature, and the atmospheric pressure.

Further, upon the engine torque swing control in the step S20, the system efficiency is calculated using the aforementioned Equation 2 or Equation 3 for the plurality of sections at S30.

Further, the system efficiency calculated for each section is compared with the system efficiency at the reference operation line, and the engine torque in the section in which the maximum system efficiency is generated among them is calculated as the optimal operating line potential. Further, as described above, a value obtained by summing the error value of the actually measured torque compared to the demand torque (the model torque) according to the accuracy of the engine torque control with the optimal operating line potential is updated as the engine torque corresponding to the optimal operating line at S40. Further, to achieve the maximum system efficiency, the engine torque is controlled to be increased based on the updated optimal operating line at S50.

Further, if it is determined that the engine torque corresponding to the optimal operating line is increased compared to the conventional reference operation line to control the engine torque to be increased at S50, the control unit 900 changes the evaporation gas throughput control in consideration of the increase in the EV traveling rate by improving the entire system efficiency at S60.

For example, as described above, the control unit 900 omits some of the steps of the operating RPM of the purge pump 200 at the fourth stage, or expands the section for each step together with the omission of the step (e.g., three steps of 15000, 40000, and 60000 RPM). Alternatively, the control unit 900 omits some of the steps of the opening amount of the purge valve 300, or expands the section for each step together with the omission. Alternatively, the throughput of the evaporation gas may be maximized within the restricted operating section of the purge pump 200 by combining the step-by-step control of the operating RPM of the purge pump 200 and the step-by-step control of the opening amount of the purge valve 300.

Furthermore, as described above, the control unit 900 may further simplify the normal step-by-step control of the operating RPM of the purge pump 200 or the opening amount of the purge valve 300 to the ON/OFF control to maximize the evaporation gas treatment efficiency. That is, the control unit 900 may control the purge pump 200 between the stop state and the state of being driven at the maximum operating speed regardless of the target purge amount, or control the purge valve 300 between the closed state and the maximum opening amount state.

As a result, the optimal operating line may be increased according to the increase in the part load max line to generally increase the system efficiency, thereby effectively treating the evaporation gas even if the EV traveling section is increased and the operable section of the purge pump 200 is reduced.

While a number of exemplary aspects and embodiments have been discussed above, those of skill in the art will recognize that still further modifications, permutations, additions and sub-combinations thereof of the features of the disclosed embodiments are still possible.

The invention claimed is:

1. An active purge system for a hybrid vehicle comprising:
   an active purge unit for pressing evaporation gas generated by a fuel tank and supplying the pressed evaporation gas to an intake pipe; and
   a control unit for controlling the active purge unit;
   wherein the control unit controls a purge flow rate of the evaporation gas according to change of an engine torque according to a change in an optimal operating line which is an operating line of an engine having maximum system efficiency which is defined as a rate of driving energy of the hybrid vehicle to an amount of fuel used, and wherein the purge flow rate is controlled by adjusting an RPM of a purge pump and an opening amount of a purge valve.

2. The active purge system for the hybrid vehicle of claim 1,
   wherein the active purge unit comprises:
      a purge line connecting the intake pipe to a canister for adsorbing the evaporation gas;
      a purge pump mounted on the purge line; and
      a purge valve mounted on the purge line to be located between the purge pump and the intake pipe.

3. The active purge system for the hybrid vehicle of claim 2, wherein the control unit adjusts the RPM of the purge pump and the opening amount of the purge valve by multi-stage control, such that the evaporation gas flowing from the purge line to the intake pipe becomes a target purge flow rate.

4. The active purge system for the hybrid vehicle of claim 3, wherein the control unit reduces the number of stages of the multi-stage control for adjusting the RPM of the purge pump or the opening amount of the purge valve, when the engine torque is increased compared to a driver demand reference torque according to the change in the optimal operating line.

5. The active purge system for the hybrid vehicle of claim 3, wherein the control unit performs an ON/OFF control for the RPM of the purge pump or the opening amount of the purge valve, when the engine torque is increased compared to a driver demand reference torque according to the change in the optimal operating line.

6. An active purge method for a hybrid vehicle having an active purge system comprising an active purge unit for pressing evaporation gas generated by a fuel tank and supplying the pressed evaporation gas to an intake pipe; and a control unit for controlling the active purge unit, the method comprising:
   updating, via the control unit, an optimal operating line of the hybrid vehicle;

increasing an engine torque compared to a reference torque so as to satisfy the updated optimal operating line; and controlling the purge flow rate of the evaporation gas according to the increasing control of the engine torque according to a change in the optimal operating line;

wherein the optimal operating line is an operating line of an engine having maximum system efficiency which is defined as a rate of driving energy of the hybrid vehicle to an amount of fuel used.

7. The active purge method for the hybrid vehicle of claim 6, wherein the updating the optimal operating line of the hybrid vehicle comprises:
   determining whether a vehicle speed is constant;
   swing-controlling an engine torque value around a reference torque, if it is determined that the vehicle speed is constant;
   dividing the engine torque into a plurality of sections upon the swing control and measuring system efficiency in each section; and
   updating an operating line corresponding to the torque having the maximum system efficiency among the plurality of sections as the optimal engine operating line.

8. The active purge method for the hybrid vehicle of claim 7, wherein the increasing the engine torque compared to the reference torque comprises:
   calculating a difference between an actually measured torque value of the reference torque and a model value as an error correction torque value;
   calculating a difference between the model value and the torque having the maximum system efficiency as an optimal operating line potential value; and
   increasing the engine torque compared to the reference torque based on a value obtained by summing the error correction torque value and the operating line potential value.

9. The active purge method for the hybrid vehicle of claim 6, wherein the updating of the optimal operating line of the hybrid vehicle further comprises:
   measuring a state of charge SOC of a battery;
   calculating an engine torque compensation value for driving the vehicle and charging the battery according to a pre-defined map, if the SOC is a reference value or less when comparing the SOC of the battery with the reference value; and
   compensating the reference torque by summing the calculated engine torque compensation value and the reference torque.

10. The active purge method for the hybrid vehicle of claim 9, wherein the updating of the optimal operating line of the hybrid vehicle further comprises:
   calculating the engine torque compensation value according to a voltage use prediction amount calculated based on the atmospheric pressure and outside air temperature of a traveling area;
   calculating a final engine torque compensation value by summing the calculated engine torque compensation value and the engine torque compensation value for charging the battery; and
   compensating the reference torque by summing the final engine torque compensation value and the reference torque.

11. The active purge method for the hybrid vehicle of claim 6, wherein the controlling of the purge flow rate of the evaporation gas controls to reduce the number of steps of a RPM of the purge pump and the opening amount of the purge valve.

12. The active purge method for the hybrid vehicle of claim 6, wherein the controlling of the purge flow rate of the evaporation gas performs an ON/OFF control for a RPM of the purge pump and the opening amount of the purge valve.

\* \* \* \* \*